(12) United States Patent
Fu et al.

(10) Patent No.: US 8,750,926 B2
(45) Date of Patent: Jun. 10, 2014

(54) SYSTEM AND METHOD FOR COORDINATING MULTIPLE RADIO TRANSCEIVERS WITHIN THE SAME DEVICE PLATFORM

(75) Inventors: I-Kang Fu, Taipei (TW); Li-Chun Ko, Taipei (TW); Chi-Chen Lee, Taipei (TW); Huanchun Ye, Cupertino, CA (US); Hong-Kai Hsu, New Taipei (TW); Willaim Plumb, Cambridge (GB)

(73) Assignee: MediaTek Inc. (TW)

( * ) Notice: Subject to any disclaimer, the term of this patent is extended or adjusted under 35 U.S.C. 154(b) by 108 days.

(21) Appl. No.: 13/134,876

(22) Filed: Jun. 20, 2011

(65) Prior Publication Data

US 2011/0312288 A1 Dec. 22, 2011

Related U.S. Application Data

(60) Provisional application No. 61/356,088, filed on Jun. 18, 2010, provisional application No. 61/373,142, filed on Aug. 12, 2010.

(51) Int. Cl.
*H04M 1/00* (2006.01)

(52) U.S. Cl.
USPC ...... 455/553.1; 455/88; 455/67.14; 455/66.1; 455/172.2; 455/552.1; 455/260; 455/434; 455/432.1; 455/68; 370/277; 370/330; 370/254; 370/229; 370/338; 370/260; 370/295; 370/316

(58) Field of Classification Search
USPC .................. 455/88, 67.14, 66.1, 172.2, 553.1, 455/552.1, 260, 432.1, 87, 557, 68, 91, 352, 455/434; 370/277, 330, 254, 332, 229, 338, 370/395.5, 328–331, 252, 336.3; 375/260, 375/295, 316
See application file for complete search history.

(56) References Cited

U.S. PATENT DOCUMENTS

2005/0059347 A1 3/2005 Haartsen ............. 455/41.2
2007/0021066 A1 1/2007 Dravida et al. ........ 455/41.2

(Continued)

FOREIGN PATENT DOCUMENTS

CN 1731692 A 8/2005
CN 101361279 A 1/2006

(Continued)

OTHER PUBLICATIONS

International Search Report and Written Opinion of International Search Authority for PCT/CN2011/075963 dated Sep. 8, 2011 (11 pages).
International Search Report and Written Opinion of International Search Authority for PCT/CN2011/078368 dated Nov. 3, 2011 (13 pages).
MediaTek et al., Discussion in In-device Coexistence Interference Avoidance, 3GPP TSG-RAN WG2 Meeting #70bis[online], Jun. 22, 2010. Retrieved from the Internet:<http://www.3gpp.org/ftp/tsg_ran/WG2_RL2/TSGR2_70bis/Docs/>.
International Search Report and Written Opinion of International Search Authority for PCT/CN2011/078377 dated Nov. 17, 2011 (11 pages).

(Continued)

*Primary Examiner* — Ganiyu A Hanidu
(74) *Attorney, Agent, or Firm* — Zheng Jin

(57) ABSTRACT

A wireless device having a central control entity that coordinates multiple radio transceivers co-located within the same device platform to mitigate coexistence interference. The wireless device comprises an LTE transceiver, a WiFi transceiver, a BT transceiver, or a GNSS receiver. In one embodiment, the central control entity receives radio signal information from the transceivers and determines control information. The control information is used to trigger FDM solution such that the transceivers operate in designated frequency channels to mitigate co-existence interference. In another embodiment, the central control entity receives traffic and scheduling information from the transceivers and determines control information. The control information is used to trigger TDM solution such that the transceivers are scheduled for transmitting or receiving radio signals over specific time duration to mitigate co-existence interference. In yet another embodiment, power control solution is used to mitigate coexistence interference.

18 Claims, 8 Drawing Sheets

(56) References Cited

U.S. PATENT DOCUMENTS

| | | | |
|---|---|---|---|
| 2007/0165754 A1 | 7/2007 | Kiukkonen et al. | 375/346 |
| 2007/0263709 A1 | 11/2007 | Kasslin et al. | 375/222 |
| 2008/0043705 A1 | 2/2008 | Desai et al. | 370/346 |
| 2008/0075059 A1 | 3/2008 | Kermoal et al. | 370/343 |
| 2009/0028115 A1 | 1/2009 | Hirsch | 370/337 |
| 2009/0054009 A1 | 2/2009 | Yang et al. | 455/78 |
| 2009/0081962 A1 | 3/2009 | Sohrabi | 455/79 |
| 2009/0088177 A1 | 4/2009 | Yang et al. | 455/452.2 |
| 2009/0168716 A1 | 7/2009 | Moon et al. | 370/329 |
| 2009/0247218 A1 | 10/2009 | Lee et al. | 455/553.1 |
| 2009/0252122 A1 | 10/2009 | Leinonen et al. | 370/332 |
| 2009/0257208 A1* | 10/2009 | Filipovic et al. | 361/760 |
| 2009/0298440 A1* | 12/2009 | Takeya et al. | 455/67.14 |
| 2009/0322596 A1 | 12/2009 | Rowitch et al. | 342/357.1 |
| 2010/0008336 A1 | 1/2010 | Keidar et al. | 370/338 |
| 2010/0027525 A1 | 2/2010 | Zhu | 370/350 |
| 2010/0046498 A1 | 2/2010 | Hall | 370/350 |
| 2010/0054207 A1 | 3/2010 | Gupta et al. | 370/331 |
| 2010/0098135 A1 | 4/2010 | Eitan | 375/141 |
| 2010/0137025 A1* | 6/2010 | Tal et al. | 455/553.1 |
| 2010/0191613 A1* | 7/2010 | Raleigh | 705/26 |
| 2010/0197235 A1 | 8/2010 | Wilhelmsson | 455/63.3 |
| 2010/0227639 A1 | 9/2010 | Kim et al. | 455/525 |
| 2011/0235621 A1 | 9/2011 | Ko et al. | 370/338 |
| 2011/0243047 A1* | 10/2011 | Dayal et al. | 370/311 |
| 2011/0256834 A1* | 10/2011 | Dayal et al. | 455/67.7 |
| 2012/0020229 A1* | 1/2012 | Dayal et al. | 370/252 |
| 2012/0113884 A1 | 5/2012 | Park et al. | 370/312 |
| 2012/0218964 A1 | 8/2012 | Park et al. | 370/329 |
| 2012/0230252 A1 | 9/2012 | Yang | 370/328 |

FOREIGN PATENT DOCUMENTS

| | | |
|---|---|---|
| CN | 10113236 A | 8/2006 |
| CN | 101141155 A | 9/2006 |
| CN | 101431808 A | 11/2007 |
| CN | 101553054 A | 3/2008 |
| CN | 101640565 A | 7/2008 |
| CN | 101365249 A | 9/2008 |
| CN | 101677290 A | 9/2008 |
| CN | 101848058 A | 3/2009 |
| CN | 101742526 A | 12/2009 |
| WO | WO2005020518 A1 | 8/2003 |
| WO | WO2010002219 A2 | 1/2010 |

OTHER PUBLICATIONS

International Search Report and Written Opinion of International Search Authority for PCT/CN2011/081042 dated Feb. 2, 2012 (10 pages).

International Search Report and Written Opinion of International Search Authority for PCT/CN2011/080479 dated Jan. 19, 2012 (12 pages).

USPTO, office action of related U.S. Appl. No. 13/317,524 dated Aug. 21, 2013 (17 pages).

USPTO, office action of related U.S. Appl. No. 13/136,862 dated Oct. 7, 2013 (26 pages).

The EPO has prepared the Search Report for the EP patent application 11833858 dated Apr. 24, 2013 (13 pages).

The SIPO has prepared the Examination Opinion for the Chinese patent application 201180003269.X dated Jun. 3, 2013 (11 pages).

The SIPO has prepared the Examination Opinion for the Chinese patent application 201180002307.X dated Jun. 21, 2013 (9 pages).

The USPTO has prepared the Office Action of related U.S. Appl. No. 13/136,862 dated Jun. 24, 2013 (33 pages).

3GPP R2-106004 TR 36.816 Vo.2.0, 3rd Generation Partnership Project; Technical Specification Group Radio Access Networks; Evolved Universal Terrestrial Radio Access (E-UTRA); Study on Signaling and Procedure foe Interference Avoidance for In-Device Coexistence; Release 10 (12 pages), Feb. 5, 2011.

3GPP TSG-RAN WG2#71bis R2-105712, Motorola; Solution Directions for LTE-ISM Coexistence; Xi'An, China, Oct. 11-15, 2010 (6 pages).

3GPP TSG-RAN WG2 Meeting#71bis R2-105587, Huawei HiSilicon; Consideration on the Details of In-Device Interference; Xi'an, China, Oct. 11-15, 2010 (4 pages).

3GPP TSG RAN WG2 Meeting#71bis R2-105336, CATT; FDM-based Approach for In-Device Coexistence Interference; Xi'an, China, Oct. 11-15, 2010 (2 pages).

3GPP TSG-RAN WG2 Meeting#71bis R2-105673, CMCC; Discussion on Moving LTE Signal Away from ISM Band for In-Device Coexistence; Xi'an, China, Oct. 11-15, 2010(4 pages).

H 3GPP TSG RAN WG2#71 R2-104444, MediaTek; Analysis in In-Device Coexistence Interference Avoidance; Madrid, Spain, Aug. 23-27, 2010 (10 pages).

* cited by examiner

US 8,750,926 B2

SYSTEM AND METHOD FOR COORDINATING MULTIPLE RADIO TRANSCEIVERS WITHIN THE SAME DEVICE PLATFORM

CROSS REFERENCE TO RELATED APPLICATIONS

This application claims priority under 35 U.S.C. §119 from U.S. Provisional Application No. 61/356,088, entitled "Method to Mitigate the Interference between LTE and other Communication System Co-located on the Same Device Platform," filed on Jun. 18, 2010; U.S. Provisional Application No. 61/373,142, entitled "Method to Trigger In-Device Coexistence Interference Mitigation in Mobile Cellular Systems," filed on Aug. 12, 2010, the subject matter of which is incorporated herein by reference.

TECHNICAL FIELD

The disclosed embodiments relate generally to wireless network communications, and, more particularly, to Multi-Radio Terminals (MRT) containing Long Term Evolution (LTE) transceiver, WiFi transceiver, BT transceiver, or GNSS receiver.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to scarce radio spectrum resource, different technologies may, operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant coexistence interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

FIG. 1 (Prior Art) is a diagram that illustrates interference between an LTE transceiver and a co-located WiFi/BT transceiver and GNSS receiver. In the example of FIG. 1, user equipment (UE) 10 is an MRT comprising an LTE transceiver 11, a GNSS receiver 12, and a BT/WiFi transceiver 13 co-located on the same device platform. LTE transceiver 11 comprises an LTE baseband module and an LTE RF module coupled to an antenna #1. GNSS receiver 12 comprises a GNSS baseband module and a GNSS RF module coupled to antenna #2. BT/WiFi transceiver 13 comprises a BT/WiFi baseband module and a BT/WiFi RF module coupled to antenna #3. When LTE transceiver 11 transmits radio signals, both GNSS receiver 12 and BT/WiFi transceiver 13 may suffer coexistence interference from LTE. Similarly, when BT/WiFi transceiver 13 transmits radio signals, both GNSS receiver 12 and LTE transceiver 11 may suffer coexistence interference from BT/WiFi. How UE 10 can simultaneously communicate with multiple networks through different transceivers and avoid/reduce coexistence interference is a challenging problem.

FIG. 2 (Prior Art) is a diagram that illustrates the signal power of radio signals from two co-located RF transceivers. In the example of FIG. 2, transceiver A and transceiver B are co-located in the same device platform (i.e., in-device). The transmit (TX) signal by transceiver A (e.g., WiFi TX in ISM CH1) is very close to the receive (RX) signal (e.g., LTE RX in Band 40) for transceiver B in frequency domain. The out of band (OOB) emission and spurious emission by transceiver A may be unacceptable to transceiver B resulted by imperfect TX filter and RF design. For example, the TX signal power level by transceiver A may be still higher (e.g. 60 dB higher before filtering) than RX signal power level for transceiver B even after the filtering (e.g., after 50 dB suppression).

In addition to imperfect TX filter and RF design, imperfect RX filter and RF design may also cause unacceptable in-device coexistence interference. For example, some RF components may be saturated due to transmit power from another in-device transceiver but cannot be completely filtered out, which results in low noise amplifier (LNA) saturation and cause analog to digital converter (ADC) to work incorrectly. Such problem actually exists regardless of how much the frequency separation between the TX channel and the RX channel is. This is because certain level of TX power (e.g., from a harmonic TX signal) may be coupled into the RX RF frontend and saturate its LNA. Various in-device coexistence interference mitigation solutions are sought.

SUMMARY

A wireless device having a central control entity that coordinates multiple radio transceivers co-located within the same device platform to mitigate coexistence interference. The wireless device comprises the central control entity, an LTE transceiver, a WiFi/BT transceiver, and a GNSS receiver.

In one embodiment, the central control entity receives radio signal information from the transceivers and determines control information. The control information is used to trigger Frequency Division Multiplexing (FDM) solution such that the transmitted/received signals moves to designated frequency channels to mitigate co-existence interference. The signal information comprises coexistence interference measurement information, received signal quality information, transmission status, an LTE serving frequency information, a WiFi frequency channel information, a BT frequency-hopping range information, and a center frequency information of GNSS signal. The control information for FDM solution comprises an instruction to trigger the LTE transceiver to indicate to an LTE base station which frequency channels are affected by coexistence interference, an instruction to trigger the LTE transceiver to send indication to an LTE base station for switching (e.g., handover, RLF) from a first RF carrier to a second RF carrier, an instruction or recommendation to switch to or use a new WiFi channel for the WiFi transceiver, and an instruction to adjust frequency hopping range for the BT transceiver.

In another embodiment, the central control entity receives traffic and scheduling information from the transceivers and determines control information. The control information is used to trigger Time Division Multiplexing (TDM) solution such that the transceivers are scheduled for transmitting or receiving radio signals over specific time duration to mitigate co-existence interference. The traffic and scheduling information comprises transmission status, operation mode, priority request, received signal quality or strength, traffic pattern information, WiFi Beacon reception time information, LTE DRX configuration, BT master/slave, and GNSS receiver type. The control information for TDM solution comprises an instruction to trigger the LTE transceiver to send recommendation of ON/OFF duration, ON/OFF ratio, starting time, or duty cycle for DRX configuration to an LTE base station, an instruction to terminate or resume the LTE/WiFi/BT transceiver TX or RX over specific time duration, an instruction to WiFi transceiver to control the transmission/reception time by negotiating with WiFi access point (AP) by using power saving protocol.

In yet another embodiment, power control solution is used to mitigate coexistence interference. For LTE power control, the central control entity determines a maximum power restriction level for the LTE transceiver based on the received signal quality for the WiFi/BT/GNSS receiver. The maximum power restriction level is recommended by the LTE transceiver to an LTE base station. For WiFi/BT power control, the central control entity instructs the WiFi/BT transceiver to adjust transmit power level if the received signal quality for LTE signal is poor.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
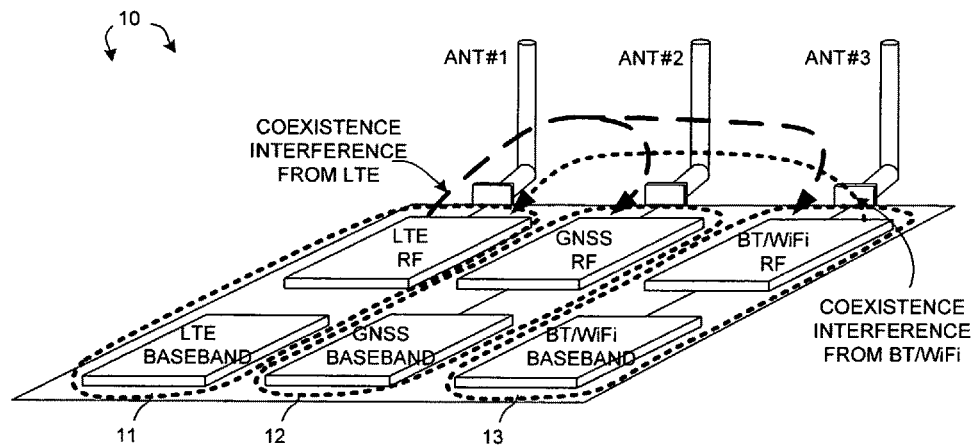
FIG. 1 (Prior Art) is a diagram that illustrates interference between an LTE transceiver and a co-located WiFi/BT transceiver and GNSS receiver.
Figure 2:
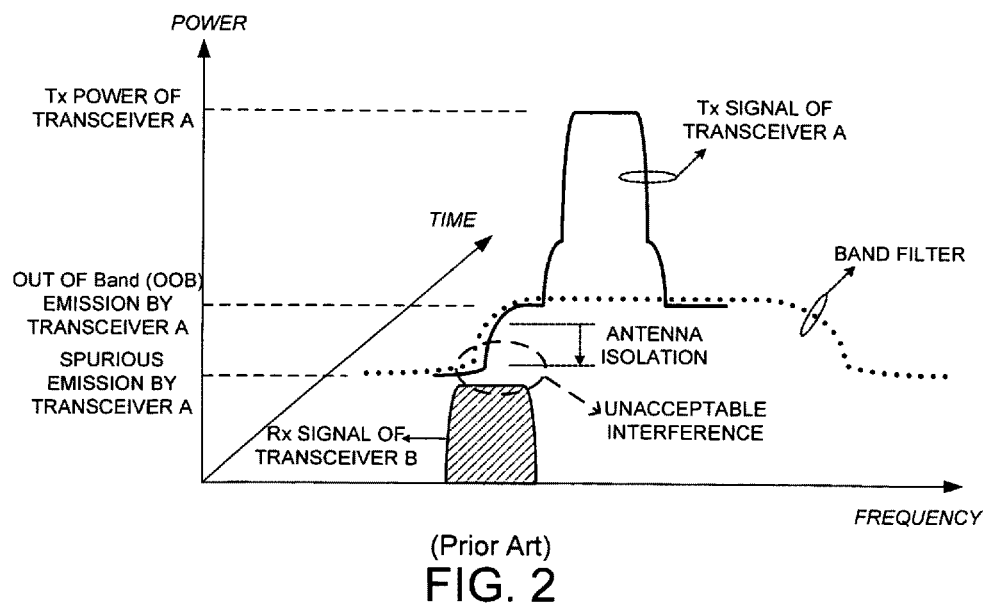
FIG. 2 (Prior Art) is a diagram that illustrates the signal power of radio signals from two co-located RF transceivers in a same device platform.
Figure 3:
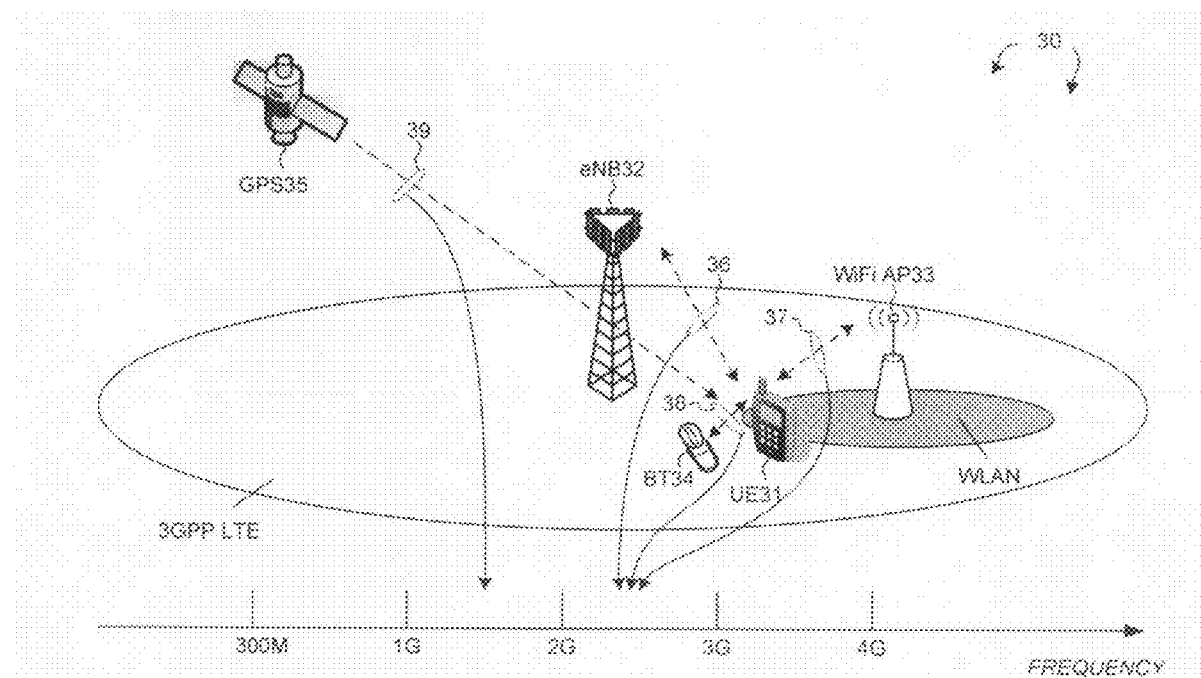
FIG. 3 illustrates a user equipment having multiple radio transceivers in a wireless communication system in accordance with one novel aspect.

FIG. 3 illustrates a user equipment UE 31 having multiple radio transceivers in a wireless communication system 30 in accordance with one novel aspect. Wireless communication system 30 comprises a user equipment UE 31, a serving base station (e.g., evolved node-B) eNB 32, a WiFi access point WiFi AP 33, a Bluetooth device BT 34, and a global positioning system satellite device GPS 35. Wireless communication system 30 provides various network access services for UE 31 via different radio access technologies. For example, eNB 32 provides cellular radio network (e.g., a 3GPP Long-Term Evolution (LTE) or LTE-Advanced (LTE-A) system) access, WiFi AP 33 provides local coverage in Wireless Local Area Network (WLAN) access, BT 34 provides short-range personal network communication, and GPS 35 provides global access as part of a Global Navigation Satellite System (GNSS). To better facilitate the various radio access technologies, UE 31 is a multi-radio terminal (MRT) that is equipped with multiple radios co-located in the same device platform (i.e., in-device).

Due to scarce radio spectrum resource, different radio access technologies may operate in overlapping or adjacent radio spectrums. As illustrated in FIG. 3, UE 31 communicates radio signal 36 with eNB 32, radio signal 37 with WiFi AP 33, radio signal 38 with BT 34, and receives radio signal 39 from GPS 35. Radio signal 36 belongs to 3GPP Band 40, radio signal 37 belongs to one of the WiFi channels, and radio signal 38 belongs to one of the seventy-nine Bluetooth channels. The frequencies of all those radio signals fall within a range from 2.3 GHz to 2.5 GHz, which may result in significant coexistence interference with each other. In one novel aspect, UE 31 comprises a central control entity that coordinates with different radio transceivers within the same device platform to mitigate coexistence interference.

Figure 4:
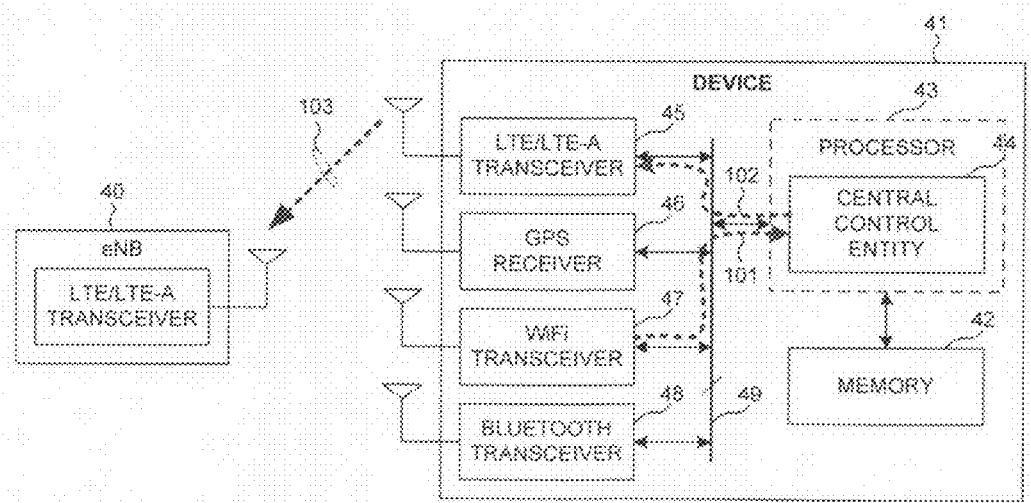
FIG. 4 illustrates a first embodiment of a simplified block diagram of an LTE user equipment having a central control entity.

FIG. 4 illustrates a first embodiment of a simplified block diagram of a wireless communication device 41 having a central control entity. Wireless communication device 41 comprises memory 42, a processor 43 having a central control entity 44, a LTE/LTE-A transceiver 45, a GPS receiver 46, a WiFi transceiver 47, a Bluetooth transceiver 48, and bus 49. In the example of FIG. 4, central control entity 44 is a logical entity physically implemented within processor 43, which is also used for device application processing for device 41. Central control entity 44 is connected to various transceivers within device 41, and communicates with the various transceivers via bus 49. For example, WiFi transceiver 47 transmits WiFi signal information and/or WiFi traffic and scheduling information to central control entity 44 (e.g., depicted by a thick dotted line 101). Based on the received WiFi information, central control entity 44 determines control information and transmits the control information to LTE/LTE-A transceiver 45 (e.g., depicted by a thick dotted line 102). In one embodiment, LTE transceiver 45 further communicates with its serving base station eNB40 based on the received control information to mitigate coexistence interference (e.g., depicted by a thick dotted line 103).

Figure 5:
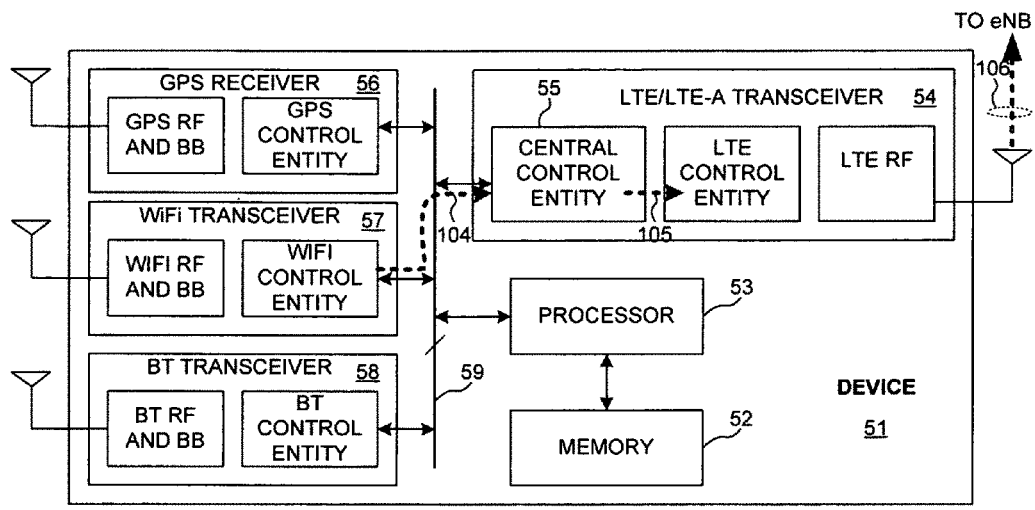
FIG. 5 illustrates a second embodiment of a simplified block diagram of an LTE user equipment having a central control entity.

FIG. 5 illustrates a second embodiment of a simplified block diagram of a wireless device 51 having a central control entity. Wireless communication device 51 comprises memory 52, a processor 53, a LTE/LTE-A transceiver 54 having a central control entity 55, a GPS receiver 56, a WiFi transceiver 57, a Bluetooth transceiver 58, and bus 59. Each transceiver contains a local control entity (e.g., the MAC processor), a radio frequency (RF) module, and a baseband (BB) module. In the example of FIG. 5, central control entity 55 is logical entity physically implemented within a processor that is physically located within LTE/LTE-A transceiver 54. Alternatively, central control entity 55 may physically be located within the WiFi transceiver or within the Bluetooth transceiver. Central control entity 55 is coupled to various radio transceivers co-located within device 41 and communicates with the various local control entities via bus 49. For example, the WiFi control entity inside WiFi transceiver 57 transmits WiFi information to central control entity 55 (e.g., depicted by a thick dotted line 104). Based on the received WiFi information, central control entity 55 determines control information and transmits the control information to the LTE control entity inside LTE/LTE-A transceiver 54 (e.g., depicted by a thick dotted line 105). In one embodiment, LTE/LTE-A transceiver 54 further communicates with its serving base station based on the received control information to mitigate coexistence interference (e.g., depicted by a thick dotted line 106).

Figure 6:
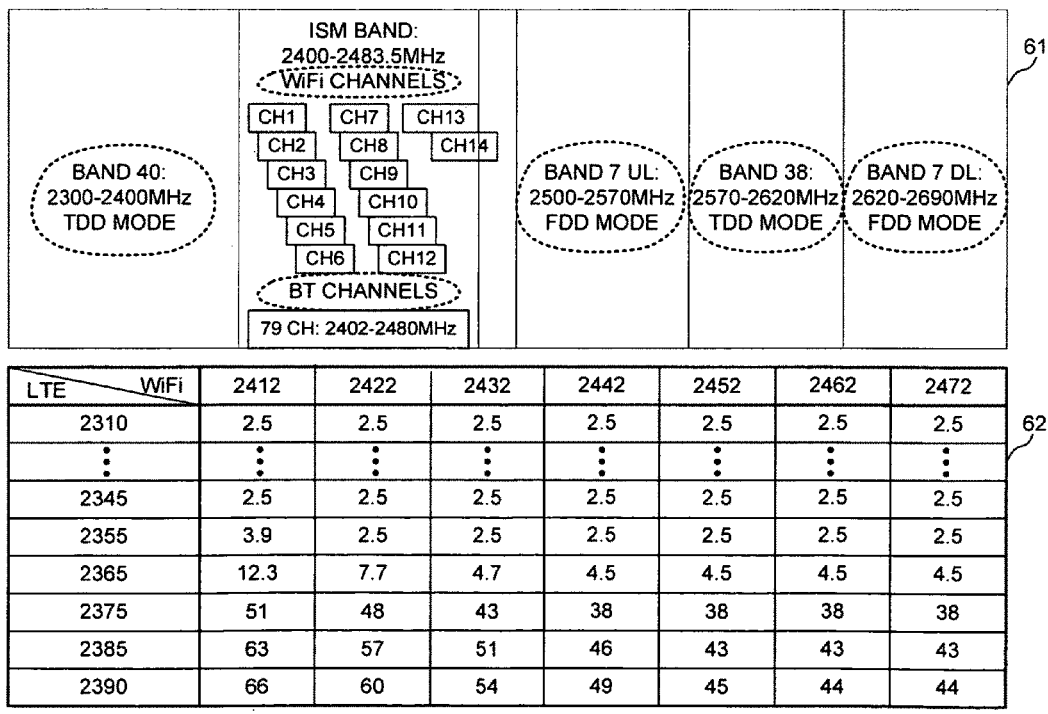
FIG. 6 illustrates a global spectrum allocation around 2.4 GHz ISM band in more detail.

How to effectively mitigate coexistence interference is a challenging problem for co-located radio transceivers operating in overlapping or adjacent frequency channels. The problem is more severe around the 2.4 GHz ISM (The Industrial, Scientific and Medical) radio frequency band. FIG. 6 illustrates a global spectrum allocation around the 2.4 GHz ISM band in more detail and the corresponding coexistence interference impact from WiFi to LTE in 3GPP Band 40. As illustrated by the top table 61 of FIG. 6, the 2.4 GHz ISM band (e.g., ranges from 2400-2483.5 MHz) is used by both fourteen WiFi channels and seventy-nine Bluetooth channels. The WiFi channel usage depends on WiFi AP decision, while Bluetooth utilizes frequency hopping across the ISM band. In addition to the crowded ISM band, 3GPP Band 40 ranges from 2300-2400 MHz, and Band 7 UL ranges from 2500-2570 MHz, both are very close to the 2.4 GHz ISM radio frequency band.

The bottom table 62 of FIG. 6 illustrates the coexistence interference impact from WiFi to LTE in 3GPP Band 40 under a typical attenuation filter. Table 62 lists the desensitization value of an LTE transceiver operating in a specific frequency channel (e.g., each row of Table 62) that is interfered by a co-located WiFi transceiver operating in another specific frequency channel (e.g., each column of Table 62). The desensitization value in Table 62 indicates how much the LTE receive signal sensitivity needs to be boosted in order to reach the same signal quality (e.g., SNR/SINR) as if there is no interference from the co-located WiFi transceiver. For example, if the LTE transceiver operates at 2310 MHz and the WiFi transceiver operates at 2412 MHz, then the LTE receive signal needs to be boosted for 2.5 dB to offset any coexistence interference. On the other hand, if the LTE transceiver operates at 2390 MHz and the WiFi transceiver operates at 2412 MHz, then the LTE receive signal needs to be boosted for 66 dB to offset any coexistence interference. Therefore, without additional interference avoidance mechanism, traditional filtering solution is insufficient to mitigate coexistence interference such that different radio access technologies can work well independently on the same device platform.

Different solutions have been sought to avoid the coexistence interference. Among the different interference avoidance solutions, frequency division multiplexing (FDM), time division multiplexing (TDM), and power management are three main solutions proposed in accordance with the present invention. Furthermore, a central control entity is utilized to coordinate co-located transceivers and to facilitate the various interference avoidance solutions. The detailed embodiments and examples of the various interference avoidance solutions are now described below with accompanying drawings.

Figure 7:
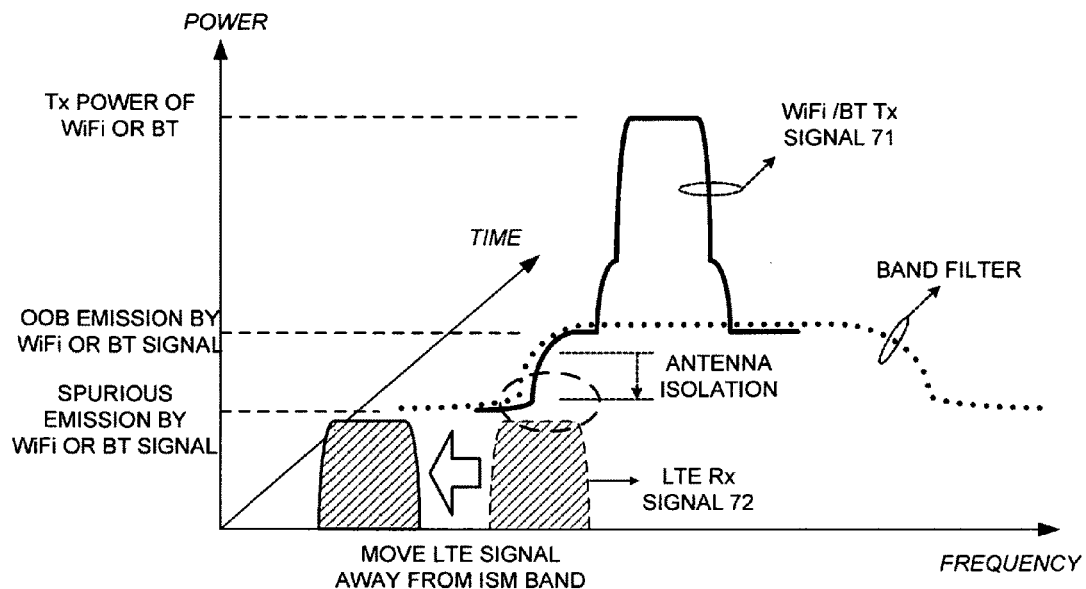
FIG. 7 illustrates a first example of a FDM solution for 3GPP in-device coexistence interference avoidance.

FIG. 7 illustrates a first example of a FDM solution for 3GPP coexistence interference avoidance. In the example of FIG. 7, an LTE transceiver is co-located with a WiFi/BT transceiver. The transmit (TX) signal by the WiFi/BT transceiver (e.g., WiFi/BT TX signal 71) is very close to the receive (RX) signal for the LTE transceiver (e.g., LTE RX signal 72) in frequency domain. As a result, the out of band (OOB) emission and spurious emission by the WiFi/BT transceiver is unacceptable to the LTE transceiver resulted by imperfect TX filter and RF design. For example, the WiFi/BT TX signal power level may be still higher (e.g. 60 dB higher before filtering) than the LTE RX signal power level even after the filtering (e.g., after 50 dB suppression) without additional interference avoidance mechanism. As illustrated in FIG. 7, one possible FDM solution is to move the LTE RX signal 72 away from the ISM band by using handover procedure.

In LTE systems, most activities including handover procedures are controlled by the network. Therefore, at the initiation of LTE network-controlled UE-assisted FDM solutions, the UE can send an indication to the network to report the problem resulted by coexistence interference, or to recommend a certain action (e.g., handover) to be performed. For example, when there is ongoing interference on the serving frequency, indication can be sent by the UE whenever it has problem in LTE downlink (DL) or ISM DL reception it cannot solve by itself, and the eNB has not taken action yet based on RRM measurements. The triggers of indication, based on pre-defined criteria or configured by the eNB, could also be based on whether there is unacceptable interference on the serving frequency, or whether there is either ongoing or potential interference on other non-serving frequencies.

Device coordination capability is required to support the 3GPP FDM solution. From LTE perspective, LTE transceiver first needs to know (e.g., via an internal controller) whether other in-device transceiver(s) is transmitting or receiving within limited time latency. More specifically, the LTE transceiver needs to know the time duration when the LTE transceiver can measure the coexistence interference due to WiFi/BT transmission, the time duration when LTE could receive without coexistence interference from WiFi/BT transceivers. Based on that knowledge, the LTE transceiver can measure coexistence interference and evaluate which frequencies may or may not be seriously interfered (e.g., unusable frequencies) for LTE RX. The LTE transceiver will then indicate the unusable frequencies to the eNB to trigger FDM. From WiFi/BT/GNSS perspective, LTE transceiver also needs to know whether the LTE transmission in which frequencies would result in unacceptable performance to other WiFi/BT/GNSS in-device receivers. Once the LTE transceiver determines that significant coexistence interference would trigger the FDM solution, the UE sends an indication to the eNB for requesting handover from the current serving frequency to another frequency that is farther away from the WiFi/BT/GNSS signal.

Figure 8:
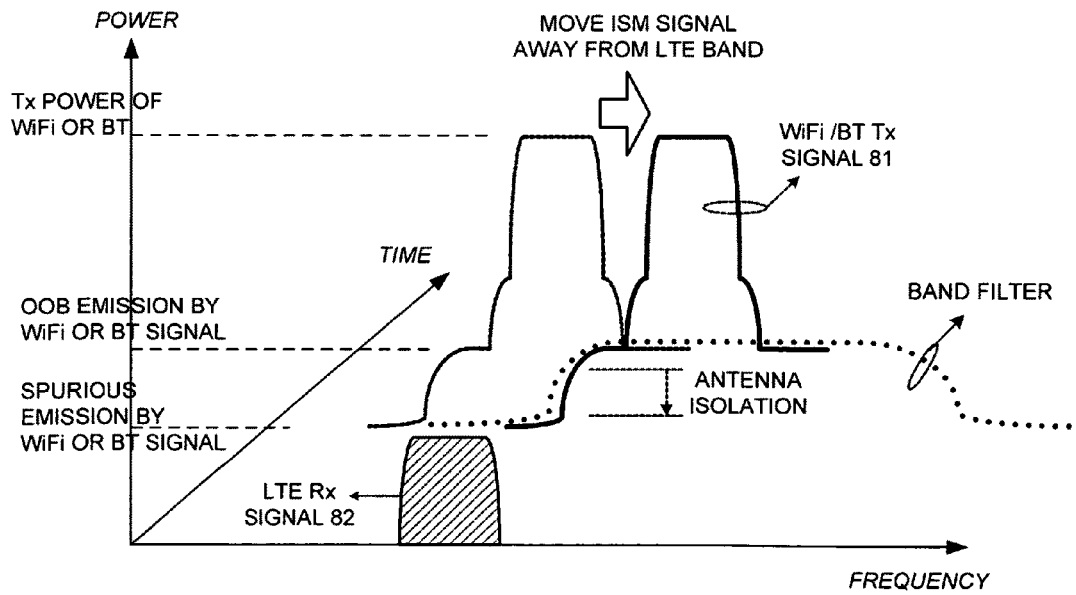
FIG. 8 illustrates a second example of a FDM solution for 3GPP in-device coexistence interference avoidance.

FIG. 8 illustrates a second example of a FDM solution for 3GPP coexistence interference avoidance. Similar to FIG. 7, the out of band (OOB) emission and spurious emission by the WiFi/BT transceiver is unacceptable to the LTE transceiver resulted by imperfect TX filter and RF design. As illustrated in FIG. 8, the FDM solution is to move the ISM signal (e.g., WiFi/BT TX signal 81) away from the LTE received signal (e.g., LTE RX signal 82). In one example, the WiFi transceiver may receive an instruction to switch to a new WiFi channel farther away from the LTE band, or a recommendation on which WiFi channel to be used. In another example, the Bluetooth transceiver may receive an instruction to adjust its frequency hopping range.

Figure 9:
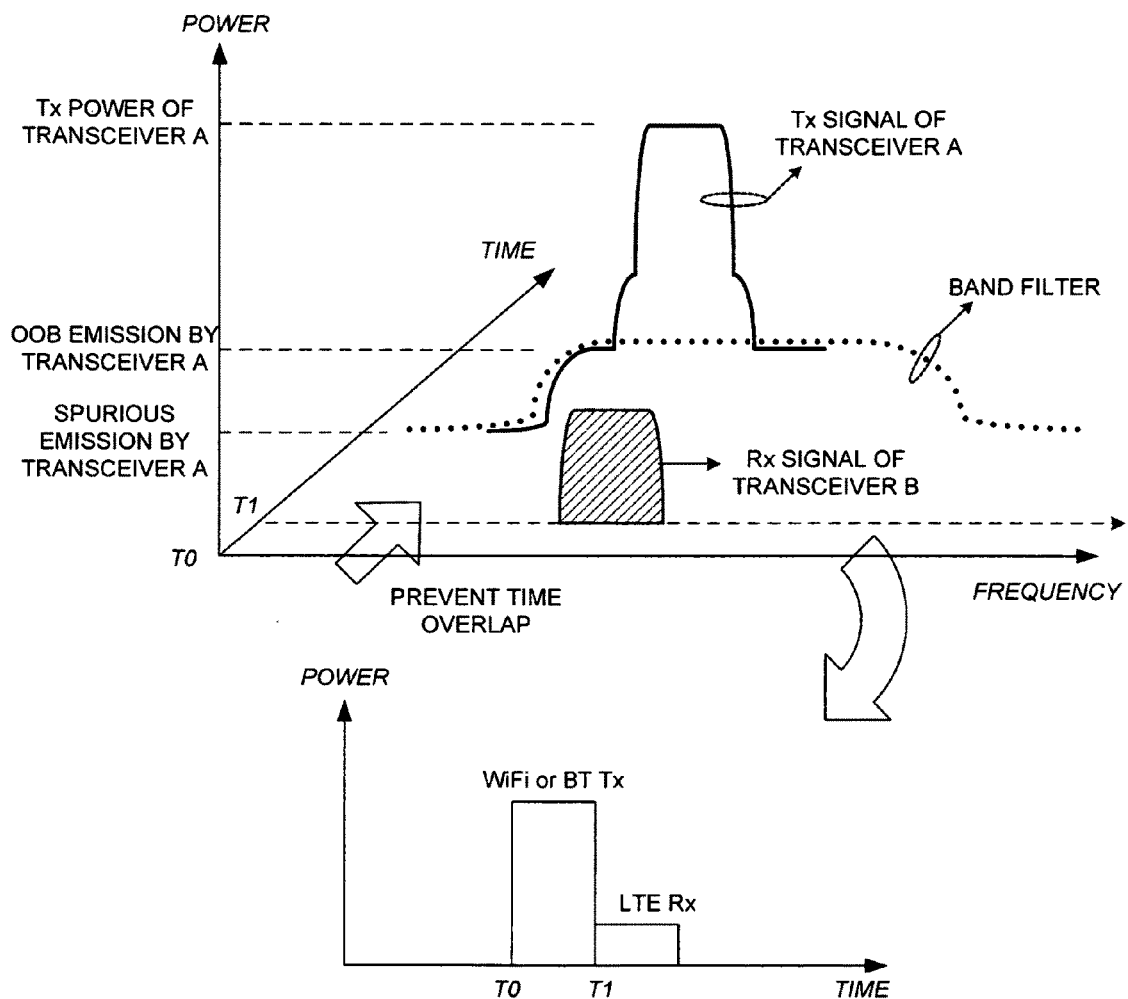
FIG. 9 illustrates an example of a TDM solution for 3GPP in-device coexistence interference avoidance.

FIG. 9 illustrates an example of a TDM solution for 3GPP coexistence interference avoidance. The basic principle of the TDM solution is to reduce time overlap between the WiFi/BT TX and the LTE RX to avoid coexistence interference. In a DRX based TDM solution, a UE recommends DRX configuration parameters to its serving eNB. Similar to FDM solution, device coordination capability is required to support 3GPP DRX based TDM solution. For example, a control entity is used to derive the recommended DRX ON/OFF configuration to the eNB. The control entity receives information from co-located WiFi/BT transceivers including operation type (e.g. WiFi AP, BT master), traffic states (e.g. Tx or Rx) and characteristics (e.g. level of activity, traffic pattern), and priority demand, and determines the recommended DRX ON/OFF duration, DRX ON/OFF ratio, duty cycle, and starting time.

In an HARQ reservation based TDM solution, a UE recommends bitmap or some assistance information to help its eNB perform sub-frame level scheduling control for interference avoidance. Various methods of scheduling transmitting and receiving time slots for co-located radio transceivers have been proposed. For example, a BT device (e.g., RF#1) first synchronizes its communication time slots with a co-located cellular radio module (e.g., RF#2), and then obtains the traffic pattern (e.g. BT eSCO) of the co-located cellular radio module. Based on the traffic pattern, the BT device selectively skips one or more TX or RX time slots to avoid data transmission or reception in certain time slots and thereby reducing interference with the co-located cellular radio module. The skipped time slots are disabled for TX or RX operation to prevent interference and to achieve more energy saving. For additional details on multi-radio coexistence, see: U.S. patent application Ser. No. 12/925,475, entitled "System and Methods for Enhancing Coexistence efficiency for multi-radio terminals," filed on Oct. 22, 2010, by Ko et al. (the subject matter of which is incorporated herein by reference).

In addition to DRX and HARQ based TDM solutions, UE autonomous denial is another type of TDM solution for interference avoidance. In one embodiment, the LTE transceiver stops UL TX to protect ISM or GNSS DL RX. This can only happen infrequently and for short-term events, otherwise the LTE connection performance will be impacted. In another embodiment, the WiFi or BT transceiver stops UL TX to protect LTE DL RX. This may be necessary to protect important LTE DL signal such as paging. The UE autonomous denial solution also requires device coordination capability (e.g., via an internal controller). The LTE transceiver needs to know the priority RX request from WiFi/BT/GNSS receiver and how long to terminate the LTE UL TX. The LTE transceiver also needs to be able to indicate its own RX priority request to the internal controller to terminate WiFi/BT UL TX. In addition, such knowledge needs to be indicated in real time manner or be indicated in a specific pattern.

Figure 10:
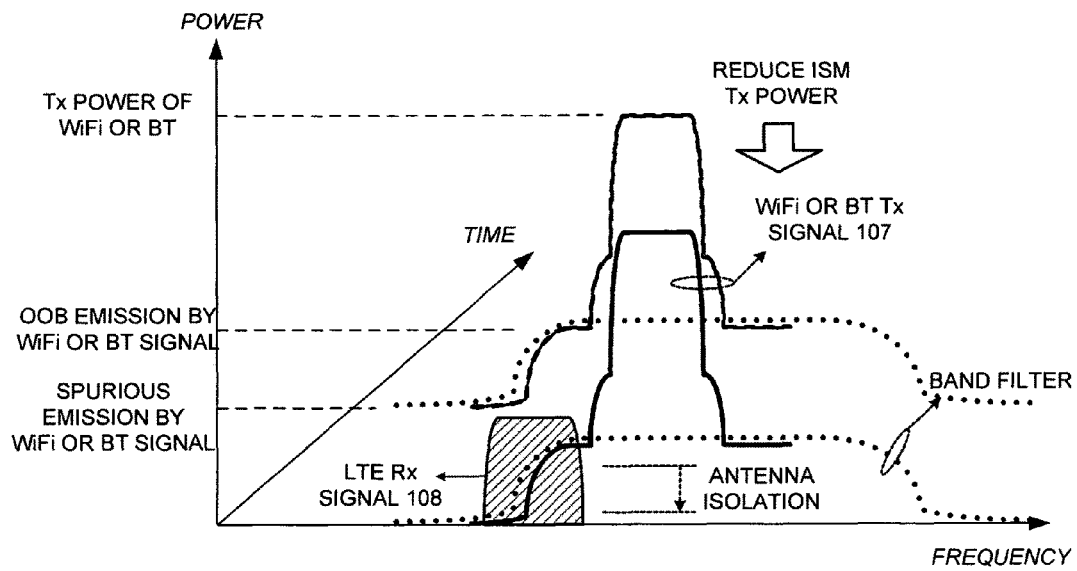
FIG. 10 illustrates a first example of a power control solution for 3GPP in-device coexistence interference avoidance.

FIG. 10 illustrates a first example of a power control solution for 3GPP coexistence interference avoidance. As illustrated in FIG. 10, when WiFi/BT TX signal 107 happens at a frequency channel close to LTE RX signal 108, the ISM transmit power of the WiFi/BT transceiver is reduced. For example, based on the LTE received signal quality, an internal controller may send an instruction to the WiFi/BT transceiver to adjust the transmit power level.

Figure 11:
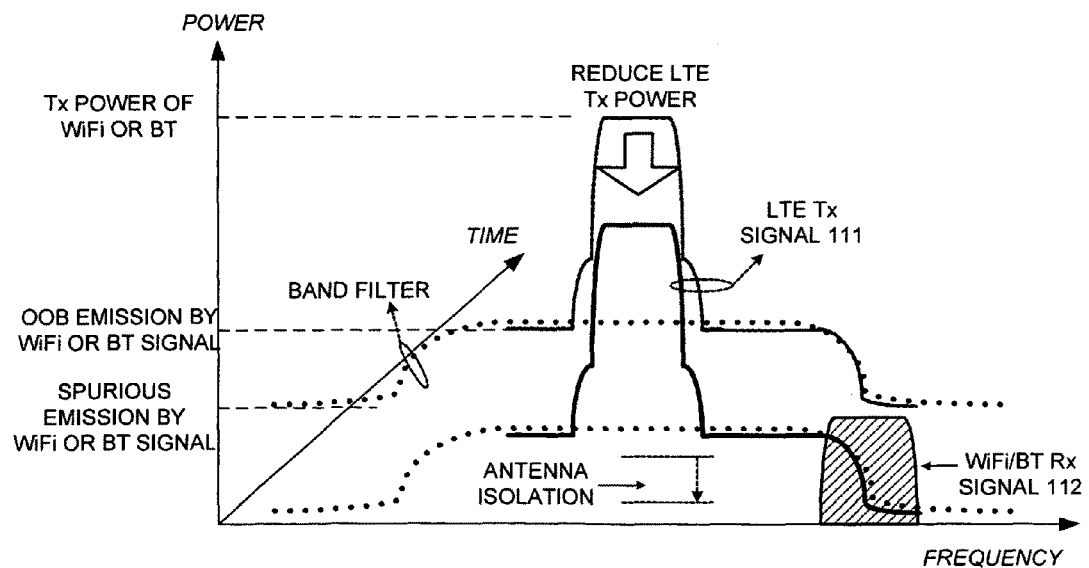
FIG. 11 illustrates a second example of a power control solution for 3GPP in-device coexistence interference avoidance.

FIG. 11 illustrates a second example of a power control solution for 3GPP coexistence interference avoidance. Similar to FIG. 10, when LTE TX signal 111 happens at a frequency channel close to WiFi/BT RX signal 112, the transmit power of the LTE transceiver can be reduced. In LTE systems, however, the legacy LTE power control mechanism cannot be broken for coexistence. Therefore, instead of reducing the LTE TX power directly, a more acceptable solution is to adjust the power headroom margin. For example, based on the WiFi/BT/GNSS received signal quality, an internal controller evaluates a new maximum transmit power restriction level. The new maximum transmit power restriction level is then recommended by the LTE transceiver to its eNB.

Because device coordination capability is required to support various solutions for coexistence interference avoidance, it is thus proposed that a central control entity to be implemented in a wireless device to coordinate co-located radio transceivers. Referring back to FIG. 4 or FIG. 5, a central control entity (e.g., 44 in FIG. 4 or 55 in FIG. 5) communicates with all co-located in-device radio transceivers and makes coexistence interference avoidance decisions. The central control entity detects which transceivers are connected, and then enables corresponding coexistence interference coordination. If a specific transceiver/receiver is not connected with the central control entity, it is assumed as uncoordinated where the central control entity may instruct other transceivers to perform passive interference avoidance (e.g., BT to reduce hopping range).

Figure 12:
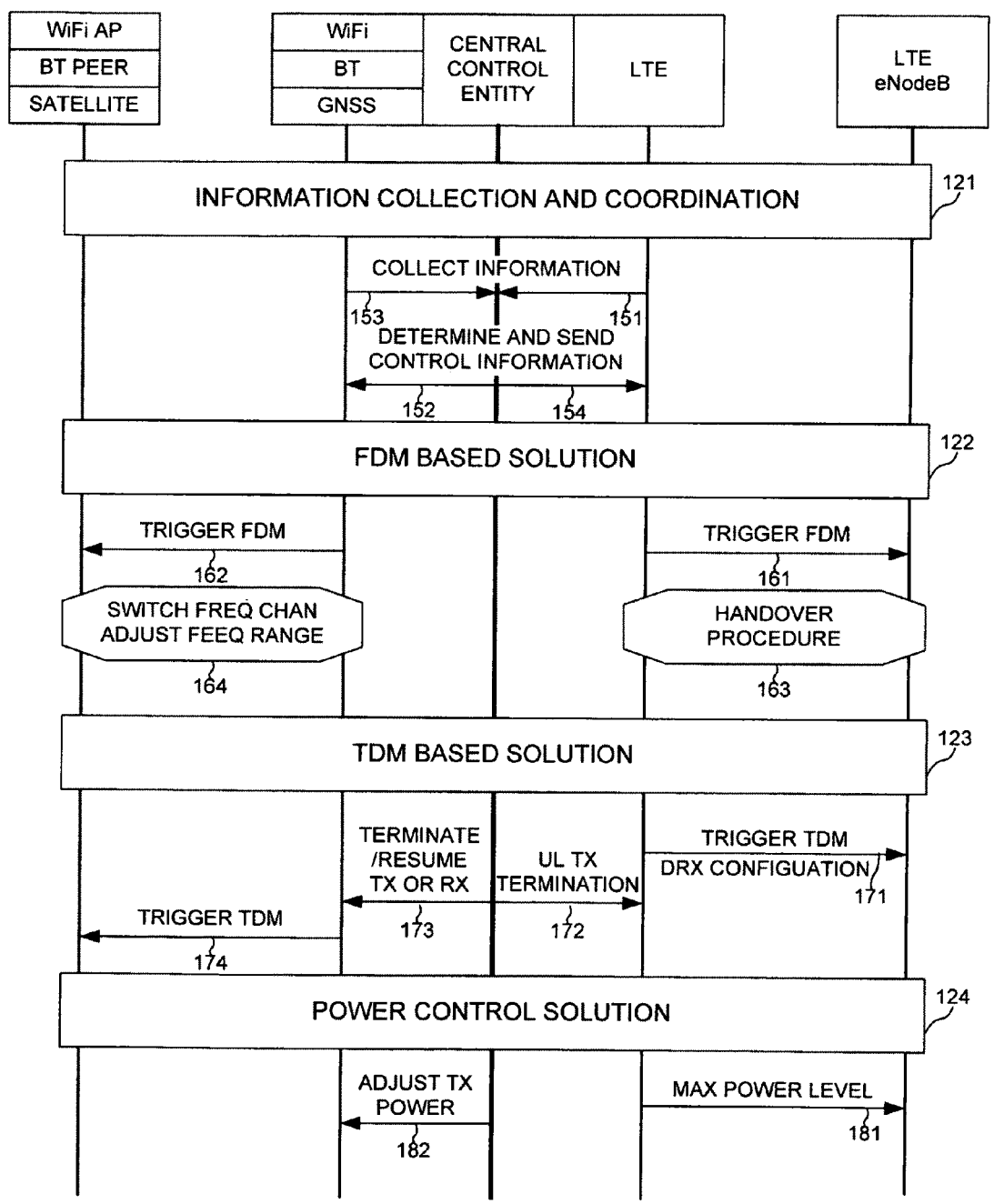
FIG. 12 illustrates a detailed procedure of in-device coexistence interference avoidance using a central control entity in accordance with one novel aspect.

FIG. 12 illustrates a detailed procedure of coexistence interference avoidance utilizing an in-device central control entity in a wireless communication system. The wireless communication system comprises a UE containing a central control entity and various co-located radio transceivers including LTE, WiFi, BT transceivers and a GNSS receiver. In order to facilitate various interference avoidance solutions, the central control entity first needs to collect information from the co-located transceivers and thereby determining and sending control information to coordinate the co-located transceivers (phase 121). For example, the central control entity receives signal/traffic/scheduling information from a first transceiver (e.g., LTE, in step 151) and sends corresponding control information to a second transceiver (e.g., WiFi/BT/GNSS, in step 152). Similarly, the central control entity receives signal/traffic/scheduling information from the second transceiver (e.g., WiFi/BT/GNSS, in step 153) and sends corresponding control information to the first transceiver (e.g., LTE, in step 154). The transceivers then perform certain actions based on the received control information to trigger FDM/TDM/power control solution.

Under FDM solution (phase 122), the central control entity receives radio signal information and determines control information to trigger FDM solution. The radio signal information related to FDM solution may include the following: transmission status (e.g., ON or OFF, TX mode or RX mode), level of coexistence interference, received signal quality or strength (e.g. RSRP, RSRQ, CQI level of LTE), serving frequency of LTE, WiFi frequency channel information, BT frequency hopping range information, and center frequency of GNSS signal. Based on the radio signal information, the central control entity determines whether the measured coexistence interference should trigger FDM solution (e.g., in step 161 for LTE and step 162 for WiFi/BT/GNSS). If FDM solution is to be triggered, then the central control entity sends the following control information: an instruction to trigger the LTE transceiver to indicate to the LTE eNB on the downlink reception problem due to coexistence interference, an instruction to trigger the LTE transceiver to send which frequencies may or may not be seriously interfered due to coexistence (e.g., usable or unusable frequencies) to the LTE eNB, an instruction to trigger the LTE transceiver to send an indication to the LTE eNB for handover operation (e.g., step 163), an instruction to the WiFi transceiver to switch to a new WiFi channel, a recommendation to the WiFi transceiver to use a specific WiFi channel, and an instruction to the BT transceiver to adjust the BT frequency hopping range (e.g., step 164).

In LTE systems, in order to mitigate coexistence interference effectively, the LTE transceiver needs to know when to measure coexistent interference and when to report the coexistence problem to the eNB. One important role of the central control entity is to collect information on whether the WiFi/BT transceiver is transmitting or receiving within limited time latency. The control entity will then determine the time duration where the LTE receiver can measure coexistence interference, and the time duration where the LTE receiver can receive without coexistence interference. The triggering condition for reporting coexistence problems and for applying FDM solution is configured by the network. Furthermore, it should be noted that the final decision of FDM solutions such as the serving frequency after handover, although triggered based on the control information, is also made by the eNB (not the UE) in LTE systems.

Under TDM solution (phase 123), the central control entity receives traffic and scheduling information and determines control information to trigger TDM solution. The traffic and scheduling information related to TDM solution may include the following: transmission status (e.g., ON or OFF, TX mode or RX mode), level of coexistence interference, received signal quality or strength (e.g. RSRP, RSRQ, CQI level of LTE), priority TX or RX request (e.g., TX or RX important signal), operation mode (e.g., WiFi AP mode, WiFi STA mode, BT eSCO, BT A2DP, initial satellite signal acquisition, GNSS tracking mode), WiFi Beacon reception time information, LTE DRX configuration, LTE connection mode (e.g., RRC_CONNECTED or RRC_IDLE), LTE Duplexing mode (e.g., TDD or FDD), LTE carrier aggregation (CA) configuration, BT master or slave, traffic pattern information (e.g., BT periodicity, required TX/RX slot number) and GNSS receiver type (e.g., GPS, GLONASS, Galileo, Beidou or dural-receiver).

Based on the traffic and scheduling information, the central control entity sends the instruction to local control entity in LTE transceiver to trigger TDM along with part of the following control information: ON/OFF duration or ratio or duty cycle information for the LTE transceiver to recommend the DRX configuration to the LTE eNB (e.g., step 171), a starting time suitable to trigger LTE interference avoidance, a time duration the LTE transceiver should terminate signal transmission (e.g., step 172), an instruction to terminate LTE UL transmission within certain time latency, an instruction to terminate WiFi/BT transmission over specific time duration (e.g., step 173), an information of specific time duration when WiFi/BT/GNSS can receive signal without LTE coexistence interference, an instruction to terminate WiFi/BT transmission within certain time latency, an instruction to resume WiFi/BT transmission, and instruction to negotiate with remote WiFi AP on data transmission and/or reception time by power saving protocol (e.g., step 174), an instruction to switch BT coexistence TX/RX ON/OFF pattern, and information of specific time duration that GNSS signal reception may suffer coexistence interference from LTE.

Under power control solution (phase 124), the central control entity receives radio signal and power information and determines control information to trigger power control solution. The radio signal and power information for power control solution mainly includes the received signal quality measured by the LTE/WiFi/BT/GNSS, the transmission power information of WiFi/BT, and the current maximum transmit power level of LTE. For LTE power control, the central control entity may base on the received signal quality of WiFi/BT/GNSS to estimate how much interference could further suffer. The central control entity may further base on the current maximum LTE transmit power level to estimate the maximum LTE transmit power level that can be afforded by the WiFi/BT/GNSS to achieve minimum received signal quality (step 181). On the other hand, for WiFi/BT power control, the central control entity may simply instruct the WiFi/BT transceiver to adjust transmit power level if the received signal quality for LTE signal is poor (step 182).

It is noted that the listed information for FDM, TDM, and power control solutions are exemplary and not mutually exclusive. Instead, additional information may be applied in any of the solutions, and the same information may be applied in multiple solutions. For example, operation type information or traffic pattern information, although are mainly used for TDM solution, may also be used for FDM solution in determining whether to trigger a possible handover procedure. Furthermore, different solutions may be applied together to better mitigate coexistence interference.

It is further noted that, although the objective of the above-illustrated solutions is to prevent and reduce coexistence interference, coexistence interference may not always be prevented or reduced after applying the various FDM/TDM/power control solutions. For example, in some geographic area, the LTE network is only deployed on a poor frequency and an LTE device will always be handover to the frequency with worse coexistence interference once it moves into that geographic area.

Figure 13:
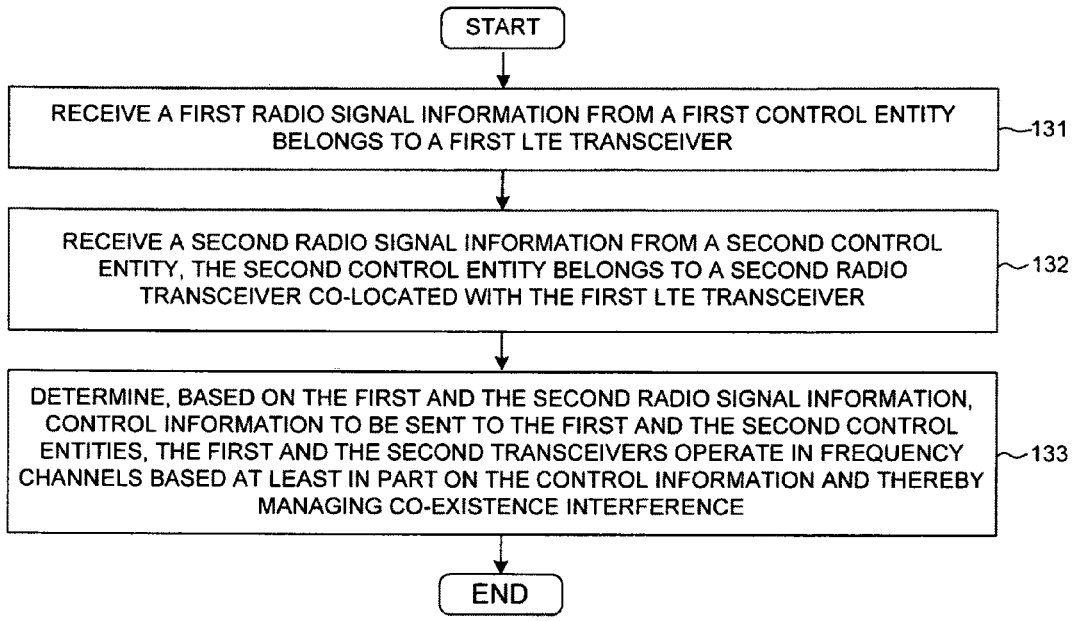
FIG. 13 is a flow chart of a method of coexistence interference avoidance using FDM solution.

FIG. 13 is a flow chart of a method of coexistence interference avoidance using FDM solution. A wireless device comprises multiple radio transceivers and a central control entity. The central control entity receives a first radio signal information from a first control entity belongs to a first LTE transceiver (step 131). The central control entity also receives a second radio signal information from a second control entity belongs to a second radio transceiver co-located with the first LTE transceiver (step 132). Based on the first and the second radio signal information, the central control entity determines control information, and transmits the control information to the first and the second control entities (step 133). At least in part based on the control information, the first and the second transceivers operate in designated frequency channels and thereby mitigate coexistence interference.

Figure 14:
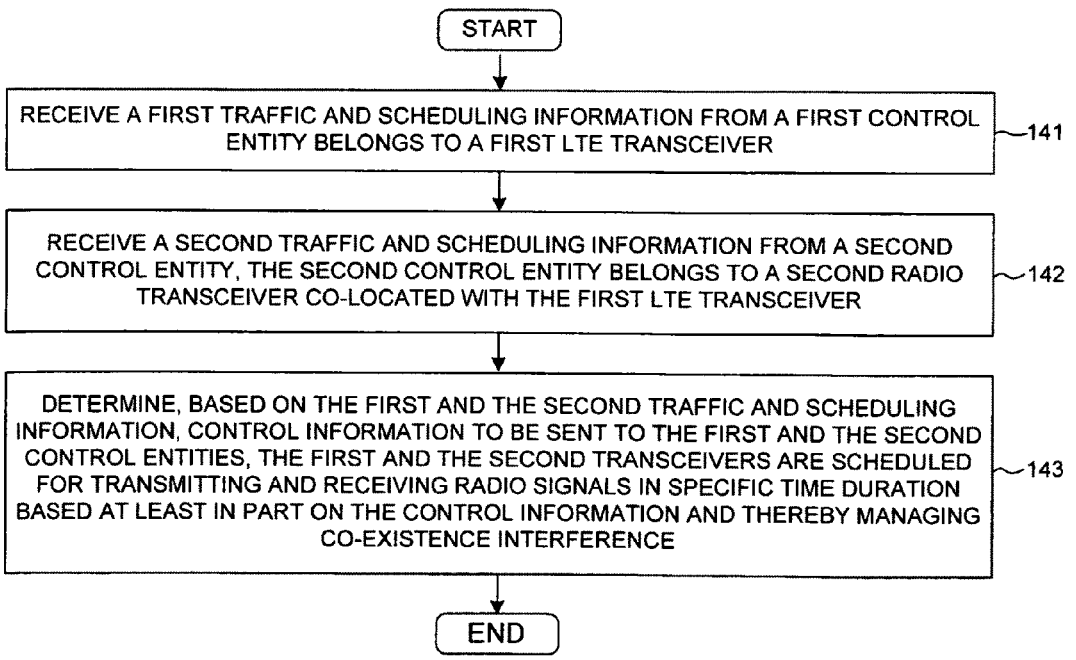
FIG. 14 is a flow chart of a method of coexistence interference avoidance using TDM solution.

FIG. 14 is a flow chart of a method of coexistence interference avoidance using TDM solution. A wireless device comprises multiple radio transceivers and a central control entity. The central control entity receives a first traffic and scheduling information from a first control entity belongs to a first LTE transceiver (step 131). The central control entity also receives a second traffic and scheduling information from a second control entity belongs to a second radio transceiver co-located with the first LTE transceiver (step 132). Based on the first and the second traffic and scheduling information, the central control entity determines control information, and transmits the control information to the first and the second control entities (step 133). At least in part based on the control information, the first and the second transceivers are scheduled for transmitting and receiving radio signals in specific time duration and thereby mitigate coexistence interference.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method comprising:
receiving a first traffic and scheduling information from a first control entity by a central control entity of a user equipment (UE), wherein the first control entity belongs to a first LTE radio transceiver of the UE;
receiving a second traffic and scheduling information from a second control entity by the central control entity, wherein the second control entity belongs to a second radio transceiver of the UE co-located with the first LTE radio transceiver; and
determining, based on the first and the second traffic and scheduling information, control information to be sent to the first and the second control entity from the central control entity, wherein the first and the second radio transceivers are scheduled for transmitting or receiving radio signals over specific time duration to reduce time overlap between reception of the first radio transceiver and transmission of the second radio transceiver based at least in part on the control information and thereby mitigating co-existence interference, and wherein the central control entity determines recommended DRX parameters for the first LTE radio transceiver to reduce the time overlap.

2. The method of claim 1, wherein the control information contains instruction to trigger the first LTE radio transceiver to indicate to an LTE base station on the downlink reception problem due to coexistence interference.

3. The method of claim 1, wherein the control information contains instruction to trigger the first LTE radio transceiver to send recommendation of changing DRX parameters including ON/OFF duration or ON/OFF ratio or ON/OFF duty cycle or starting time for DRX operation to an LTE base station.

4. The method of claim 1, wherein the control information contains instruction for UE to autonomously terminate or resume the first LTE radio transceiver transmission or reception over specific time duration.

5. The method of claim 1, wherein the second radio transceiver is a WiFi transceiver, and wherein the control information contains instruction to terminate or resume WiFi transmission or reception over specific time duration for the second WiFi transceiver.

6. The method of claim 1, wherein the second radio transceiver is a WiFi transceiver, and wherein the control information contains instruction to communicate with external WiFi AP to negotiate the transmission time base on power saving protocol.

7. The method of claim 1, wherein the second radio transceiver is a Bluetooth (BT) transceiver, and wherein the control information contains instruction to terminate or resume BT transmission or reception over specific time duration for the second BT transceiver.

8. The method of claim 1, wherein the second radio transceiver is a Bluetooth (BT) transceiver, and wherein the control information contains instruction to communicate remote BT terminal to negotiate the transmission or reception over specific BT time slots for the second BT transceiver.

9. The method of claim 1, wherein the first and the second traffic and scheduling information comprises at least one of coexistence interference measurement information, transmission time information, transmission status information, operation mode information, priority request information, received signal quality information, traffic pattern information, WiFi Beacon reception time information, LTE DRX configuration information, BT master/slave information, and GNSS receiver type information.

10. A wireless communication device, comprising:
a first control entity belongs to a first LTE radio transceiver;
a co-located second control entity belongs to a co-located second radio transceiver; and
a central control entity that receives traffic and scheduling information from the first and the second control entity, wherein the central control entity determines control information to be sent to the first and the second control entity, and wherein the first and the second radio transceivers are scheduled for transmitting or receiving radio signals over specific time duration to reduce time overlap between reception of the first radio transceiver and transmission of the second radio transceiver based at least in part on the control information and thereby mitigating co-existence interference, and wherein the central control entity determines recommended DRX parameters for the first LTE radio transceiver to reduce the time overlap.

11. The wireless communication device of claim 10, wherein the control information contains instruction to trigger the first LTE radio transceiver to indicate to an LTE base station on the downlink reception problem due to coexistence interference.

12. The wireless communication device of claim 10, wherein the control information contains instruction to trigger the first LTE radio transceiver to send recommendation of changing DRX parameters including ON/OFF duration or ON/OFF ratio or ON/OFF duty cycle or starting time for DRX operation to an LTE base station.

13. The wireless communication device of claim 10, wherein the control information contains instruction to autonomously terminate or resume the first LTE radio transceiver transmission or reception over specific time duration.

14. The wireless communication device of claim 10, wherein the second radio transceiver is a WiFi transceiver, and wherein the control information contains instruction to terminate or resume WiFi transmission or reception over specific time duration for the second WiFi transceiver.

15. The wireless communication device of claim 10, wherein the second radio transceiver is a WiFi transceiver, and wherein the control information contains instruction to communicate with external WiFi AP to negotiate the transmission time base on power saving protocol.

16. The wireless communication device of claim 10, wherein the second radio transceiver is a Bluetooth (BT)

transceiver, and wherein the control information contains instruction to terminate or resume BT transmission or reception over specific time duration for the second BT transceiver.

17. The wireless communication device of claim 10, wherein the second radio transceiver is a Bluetooth (BT) transceiver, and wherein the control information contains instruction to communicate remote BT terminal to negotiate the transmission or reception over specific BT time slots for the second BT transceiver.

18. The wireless communication device of claim 10, wherein the first and the second traffic and scheduling information comprises at least one of coexistence interference measurement information, transmission time information, transmission status information, operation mode information, priority request information, received signal quality information, traffic pattern information, WiFi Beacon reception time information, LTE DRX configuration information, BT master/slave information, and GNSS receiver type information.

* * * * *